(12) United States Patent
Shimizu et al.

(10) Patent No.: US 10,555,387 B2
(45) Date of Patent: Feb. 4, 2020

(54) LIGHT-EMITTING ELEMENT DRIVE CIRCUIT AND PORTABLE ELECTRONIC INSTRUMENT

(71) Applicant: SHARP KABUSHIKI KAISHA, Sakai, Osaka (JP)

(72) Inventors: Takayuki Shimizu, Sakai (JP); Yoshiki Ikuta, Sakai (JP); Hideki Sato, Sakai (JP); Takuma Hiramatsu, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/155,832

(22) Filed: Oct. 9, 2018

(65) Prior Publication Data

US 2019/0159309 A1    May 23, 2019

(30) Foreign Application Priority Data

Nov. 17, 2017    (JP) .................................. 2017-221863

(51) Int. Cl.
*H05B 33/08*    (2006.01)
*G09G 3/32*    (2016.01)
*H05B 37/02*    (2006.01)

(52) U.S. Cl.
CPC .......... *H05B 33/0815* (2013.01); *G09G 3/32* (2013.01); *H05B 33/0827* (2013.01); *H05B 33/0851* (2013.01); *H05B 33/0854* (2013.01); *H05B 37/02* (2013.01); *H05B 37/0227* (2013.01)

(58) Field of Classification Search
CPC ............ H05B 33/0815; H05B 33/0854; H05B 33/0827; H05B 33/0851; H05B 37/02; G09G 3/32
See application file for complete search history.

(56) References Cited

U.S. PATENT DOCUMENTS

| 2008/0224632 A1* | 9/2008 | Noda .................. H05B 33/0812 315/291 |
| 2013/0221368 A1* | 8/2013 | Oraw ...................... H01L 27/15 257/76 |
| 2017/0142786 A1* | 5/2017 | Cai ..................... H03K 17/6872 |

FOREIGN PATENT DOCUMENTS

| JP | 2006-237382 A | 9/2006 |
| JP | 2013-187447 A | 9/2013 |

* cited by examiner

*Primary Examiner* — Renan Luque
(74) *Attorney, Agent, or Firm* — ScienBiziP, P.C.

(57) ABSTRACT

There is provided a VCSEL drive circuit that causes a VCSEL to emit pulsed light in a light emission period, including a drive adjustment unit that adjust a first voltage which is a voltage of drains of a PMOS transistor and an NMOS transistor in a constant current circuit and a second voltage which is a voltage of a drain of an NMOS transistor that drives the VCSEL to be the same voltage in a pre-light emission period before the light emission period.

9 Claims, 8 Drawing Sheets

U.S. 10,555,387 B2

LIGHT-EMITTING ELEMENT DRIVE CIRCUIT AND PORTABLE ELECTRONIC INSTRUMENT

BACKGROUND

1. Field

The present disclosure relates to a light-emitting element drive circuit used for a time of flight (TOF) proximity sensor and a distance measurement sensor which measure the time when radiated light is reflected and returns and measure the distance to a target, and a portal electronic instrument including the light-emitting element drive circuit.

2. Description of the Related Art

In recent years, portable information terminals such as smartphones have been widely spread. Due to the downsizing of cameras, proximity sensors, azimuth sensors, acceleration sensors, angular velocity sensors, illuminance sensors, and the like, various types of sensors are being mounted on this portable information terminal. In the related art, autofocus (AF) of a camera is generally used by autofocusing the camera built in a portable information terminal by utilizing the contrast of an image. However, in a case where the contrast of an imaging target is low in a dark place or the like, the AF speed is highly lowered, and the AF using the contrast has a weak point such that focusing of the lens is lost. For this reason, there is a demand for a small and high-speed distance measurement sensor capable of high-speed AF even in a dark place, and in recent years, a TOF distance measurement sensor for AF is beginning to be mounted on a portable information terminal. Further, in security applications, a demand for a sensor that outputs two-dimensional distance information such as face recognition and the like has been increasing.

In addition, also in robot applications such as drone, small and light distance measurement sensors are demanded, and a TOF distance measurement sensor is useful, which is helpful for downsizing as compared with a distance measurement sensor using a triangulation-method PSD light-receiving element.

FIG. 8 is a block view showing a VCSEL drive circuit 100 used in a TOF distance measurement sensor of the related art. The VCSEL drive circuit 100 includes a constant current source Io, an NMOS transistor NM0 which is connected to the drain and the gate and serves as a reference of a current mirror, and NMOS transistors NM1 to NM4 whose drains are connected to the cathode side of a VCSEL. The VCSEL drive circuit 100 may adjust the drive current of the VCSEL in 15 stages in the range of 8Io to 120Io by control signals ADJ0 to ADJ3. In the case of the VCSEL drive circuit 100, the drain voltages of the NMOS transistors NM1 to NM4 fluctuate due to fluctuations in a forward voltage (VF) of a power supply voltage VCC or VCSEL, causing a problem that the drive current fluctuates.

Related to the above problem, related arts in which the drain-source voltage of a transistor of a current mirror as a reference and the drain-source voltage of a transistor driving a light-emitting element are the same voltage are disclosed in Japanese Unexamined Patent Application Publication No. 2006-237382 and Japanese Unexamined Patent Application Publication No. 2013-187447. However, in the related arts, the currents flowing through a plurality of current-generating elements are made uniform and may not be applied to driving in the case of causing a light-emitting element to emit pulsed light.

SUMMARY

It is desirable to suppress fluctuation of a drive current in a light-emitting element drive circuit that causes a light-emitting element to emit pulsed light.

According to an aspect of the disclosure, there is provided a light-emitting element drive circuit that causes a light-emitting element to emit pulsed light in a light emission period, including a drive adjustment unit that adjusts a first voltage which is a voltage of a drain of a first transistor included in a constant current circuit and a second voltage which is a voltage of a drain of a second transistor that drives the light-emitting element to be the same voltage in a pre-light emission period before the light emission period.

DESCRIPTION OF THE EMBODIMENTS

Embodiment 1

Figure 1:
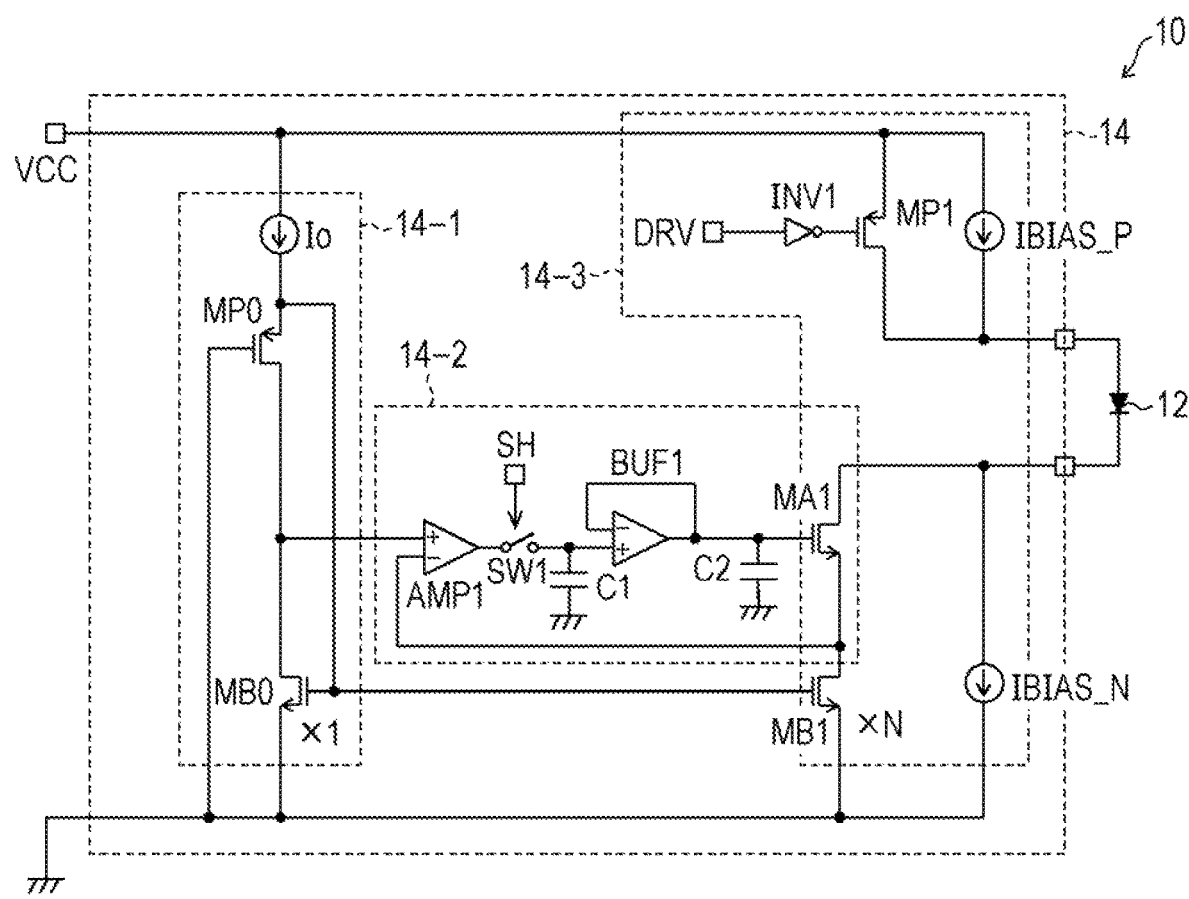
FIG. 1 is a block view of a VCSEL drive circuit according to Embodiment 1 of the present disclosure.

Hereinafter, one embodiment of the present disclosure will be described in detail.
VCSEL Drive Circuit
FIG. 1 is a block view of a VCSEL drive circuit 10 which is a light-emitting element drive circuit according to Embodiment 1 of the present disclosure. The VCSEL drive circuit 10 causes the VCSEL12, which is a light-emitting element, to emit pulsed light in a light emission period. The VCSEL drive circuit 10 is used, for example, for a TOF distance measurement sensor that measures the distance to a target 50.

The VCSEL drive circuit 10 includes a VCSEL12 and a drive control unit 14.

The VCSEL12 outputs pulsed light.

The drive control unit 14 drives the VCSEL12.

The drive control unit 14 includes a constant current circuit 14-1, a drive adjustment unit 14-2, and a light-emitting drive portion 14-3.

The constant current circuit 14-1 includes a PMOS transistor MP0 and an NMOS transistor MB0 which are two first transistors, and a constant current source Io.

The gate of the PMOS transistor MP0 is grounded to a GND line, the source is connected to the constant current source Io and the gate of an NMOS transistor MB1 to be described later, and the drain is connected to the drain of the NMOS transistor MB0.

The gate of the NMOS transistor MB0 is connected to the constant current source Io and the gate of the NMOS transistor MB1, the source is grounded to the GND line, and the drain is connected to the drain of the PMOS transistor MP0.

The constant current circuit 14-1 outputs a reference voltage of a current mirror to the light-emitting drive portion 14-3.

The drive adjustment unit 14-2 adjusts so that the voltage (first voltage) of the drains of the PMOS transistor MP0 and the NMOS transistor MB0 and the voltage (second voltage) of the drain of the NMOS transistor MB1 are the same voltage in a pre-light emission period before the light emission period. The drive adjustment unit 14-2 includes at least an operational amplifier AMP1, an NMOS transistor MA1, and a switch SW1.

At the input of the operational amplifier AMP1, the drains of the PMOS transistor MP0 and the NMOS transistor MB0 are connected to the drain of the NMOS transistor MB1. The operational amplifier AMP1 is a differential amplifier to which the first voltage and the second voltage are input.

The NMOS transistor MA1 has a function of adjusting the drain voltage of the NMOS transistor MB1 in accordance with the output of the operational amplifier AMP1. In a state where the switch SW1 is on in the pre-light emission (Pre light emission) period in FIG. 4, in a case where a switch signal SH is at a high level, the switch SW1 is turned on. Feedback is applied to the operational amplifier AMP1 so that + input (the drain of the PMOS transistor MP0 and the drain of the NMOS transistor MB0) and − input (the drain of the NMOS transistor MB1) of the operational amplifier AMP1 have the same voltage in the pre-light emission period in FIG. 4. The switch SW1 is on in the pre-light emission, and immediately before the end of the pre-light emission period, the switch signal SH becomes low level and is turned off. The output voltage of the operational amplifier AMP1 at the end of the pre-light emission period is sampled and held as the voltage across a capacitor C1. The sampled and held voltage of the capacitor C1 is buffered by a buffer amplifier BUF1 and applied to the gate of the NMOS transistor MA1. As a result, the state where the voltage of the drain of the NMOS transistor MB0 and the voltage of the drain of the NMOS transistor MB1 are the same voltage is held in the period (that is, the light emission period of the VCSEL12) when the PMOS transistor MP1 is on, and the current flowing through the VCSEL12 is stabilized.

Since the pulse width in the light emission period of the VCSEL12 is 1/1000 or less of the pulse width in the pre-light emission period, feedback control may not be performed in the light emission period of the VCSEL12. Therefore, in the present embodiment, feedback is applied in the pre-light emission period to hold the state at the end of the pre-light emission period.

The light-emitting drive portion 14-3 includes at least a PMOS transistor MP1, an NMOS transistor MB1, a bias current source IBIAS_P, and a bias current source IBIAS_N.

The NMOS transistor MB1 is a second transistor that drives the VCSEL12.

The PMOS transistor MP1 is turned on in a case where a DRV signal is at a high level. In a case where the switch SW1 is on and the PMOS transistor MP1 is on, a drive current flows through the VCSEL12.

The bias current source IBIAS_P connected in parallel to the PMOS transistor MP1 and the bias current source IBIAS_N connected in parallel to the NMOS transistor MB1 are current sources of the same current, and a DC current regularly flows through the VCSEL12. It is possible to reduce a response delay in a case where pulsed light is emitted by the DC current by the bias current source IBIAS_P and the bias current source IBIAS_N.

The gate of the NMOS transistor MB0 is connected to the gate of the NMOS transistor MB1 through which a current N times that of the NMOS transistor MB0 flows.

The drive adjustment unit 14-2 adjusts so that the voltage of the drains of the PMOS transistor MP0 and the NMOS transistor MB0 is the same voltage with the voltage of the drain of the NMOS transistor MB1. As a result, the drive control unit 14 may accurately control the drive current applied to the VCSEL12 to N×Io.

Distance Measurement Sensor

Figure 2:
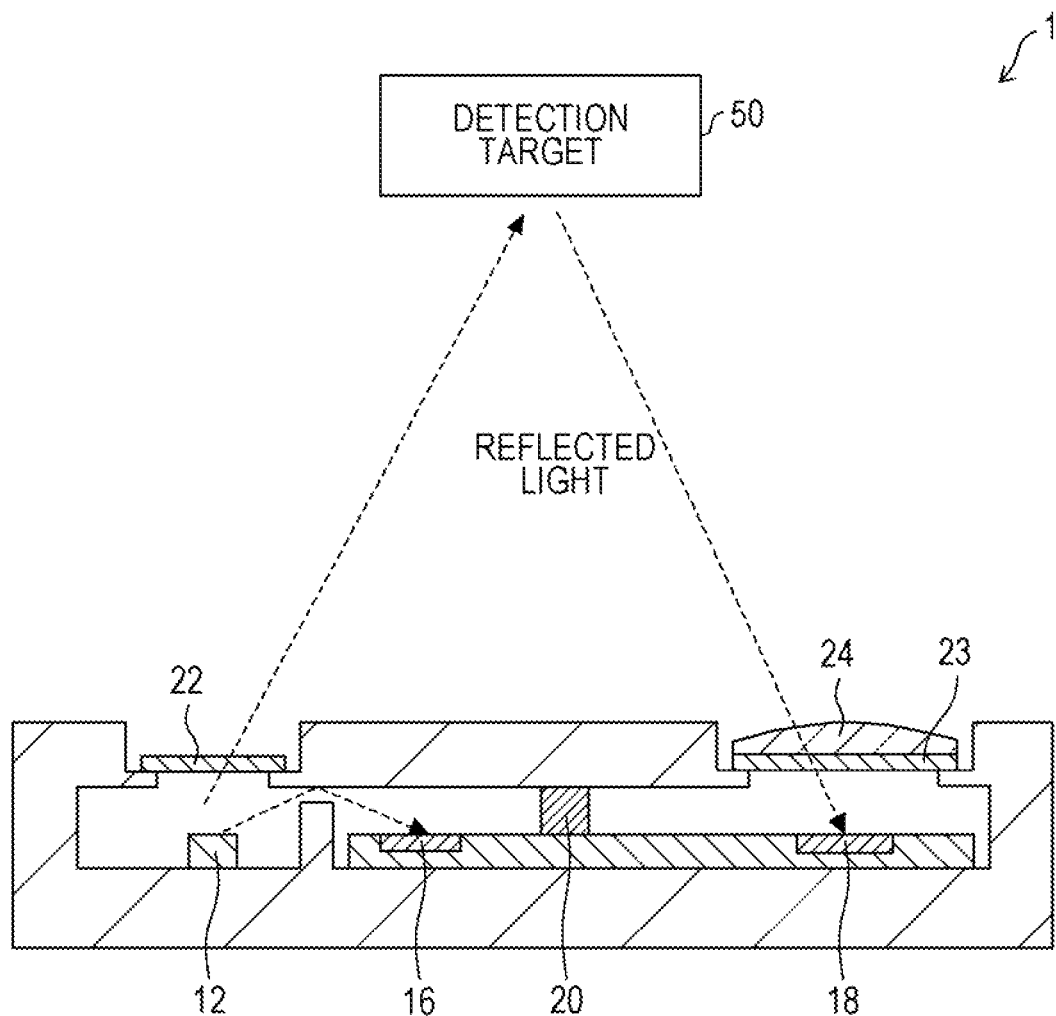
FIG. 2 is a cross-sectional view of a TOF distance measurement sensor according to Embodiment 1 of the present disclosure.

FIG. 2 is a cross-sectional view of a TOF distance measurement sensor 1. The distance measurement sensor 1 may be mounted on a portable information terminal such as a smartphone, for example.

The distance measurement sensor 1 includes the VCSEL12, a drive control unit 14, a reference-side SPAD array 16, a return-side SPAD array 18, a light-shielding wall 20, an optical filter 22, an optical filter 23, and a concentrating lens 24.

As shown in FIG. 2, only the direct light from the VCSEL12 is incident on the reference-side SPAD array 16. The reference-side SPAD array 16 directly receives the pulsed light output from the VCSEL12.

In addition, in the return-side SPAD array 18, only the pulsed light reflected by the detection target 50 is incident and received.

The light-shielding wall 20 is disposed between the reference-side SPAD array 16 and the return-side SPAD array 18. The light-shielding wall 20 stops direct light from the VCSEL12 from entering the return-side SPAD array 18.

The optical filter 22 is a band pass filter that allows wavelengths near the emission wavelength of the VCSEL12 to pass.

The concentrating lens 24 is disposed on the optical path of the light passing through the optical filter 22. The imaging position on the return-side SPAD array 18 changes depending on the position of the detection target 50.

Figure 3:
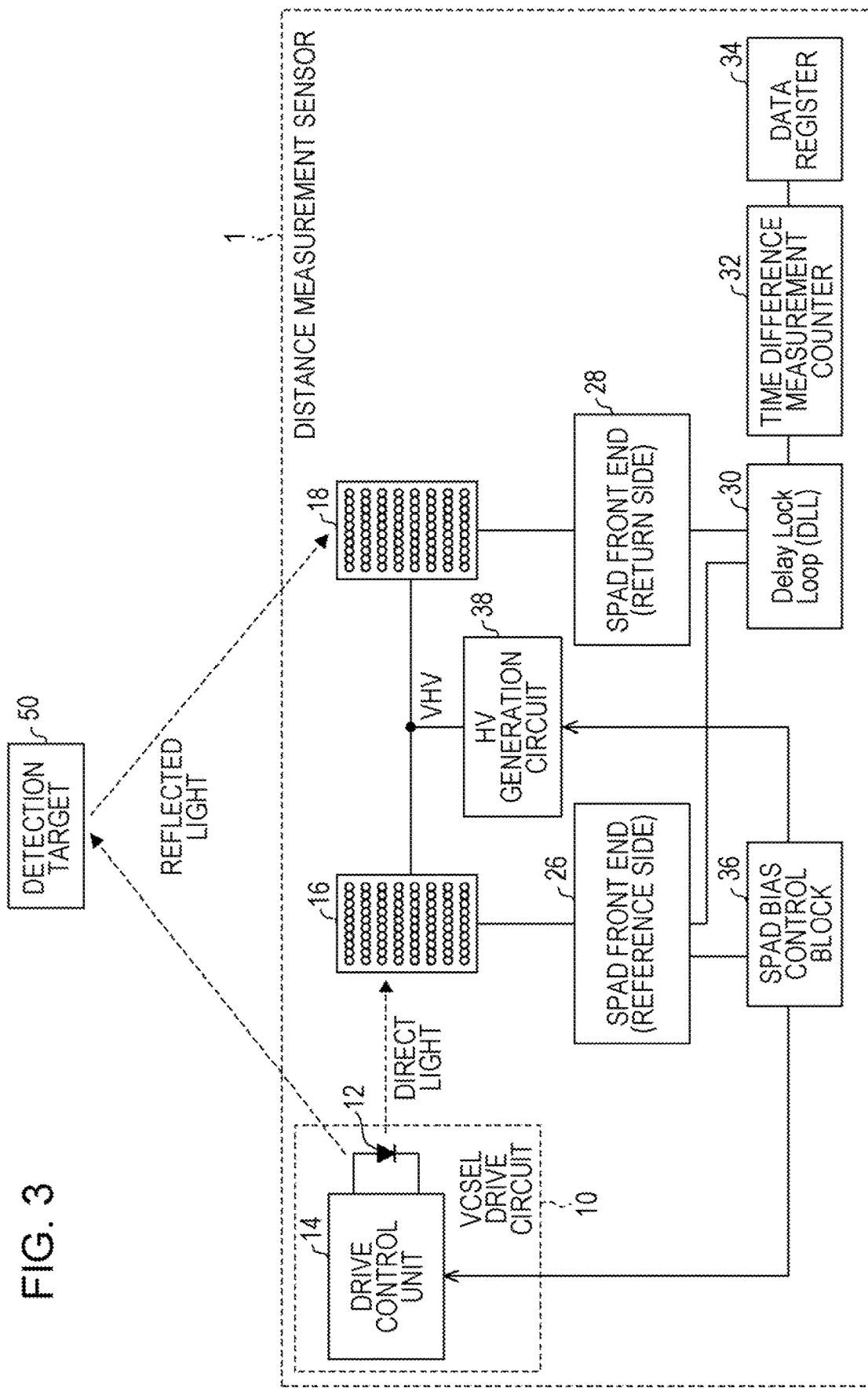
FIG. 3 is a block view of the TOF distance measurement sensor according to Embodiment 1 of the present disclosure.

FIG. 3 shows a block view of the TOF distance measurement sensor 1.

The distance measurement sensor 1 includes a SPAD front end 26 corresponding to the reference-side SPAD array 16, a SPAD front end 28 corresponding to the return-side SPAD array 18, a delay lock loop (DLL) 30, a time difference measurement counter 32, a data register 34, a SPAD bias control block 36, and an HV generation circuit 38 in addition to the VCSEL12, the drive control unit 14, the reference-side SPAD array 16, and the return-side SPAD array 18.

Each of the reference-side SPAD array 16 and the return-side SPAD array 18 is connected to corresponding SPAD front-end circuits 26 and 28. The SPAD front-end circuits 26 and 28 shape the waveforms of the pulse signals output by the corresponding SPAD arrays 16 and 18.

The SPAD front-end circuits 26 and 28 are connected to the DLL30. The SPAD front-end circuits 26 and 28 output the waveform-shaped signals to the DLL30.

The DLL30 detects the average value of the time difference between the pulsed light on the return side that is waveform-shaped by the SPAD front end 28 and the pulsed light on the reference side that is waveform-shaped by the SPAD front end 26. The time difference detected by the DLL30 corresponds to a flight time TOF of the light at the distance between the distance measurement sensor 1 and the detection target 50.

The time difference measurement counter 32 measures the time difference detected by the DLL30 with a counter, thereby calculating the distance from the distance measurement sensor 10 to the detection target 50.

The data register 34 stores distance data.

Operation Sequence of Distance Measurement Sensor

Figure 4:
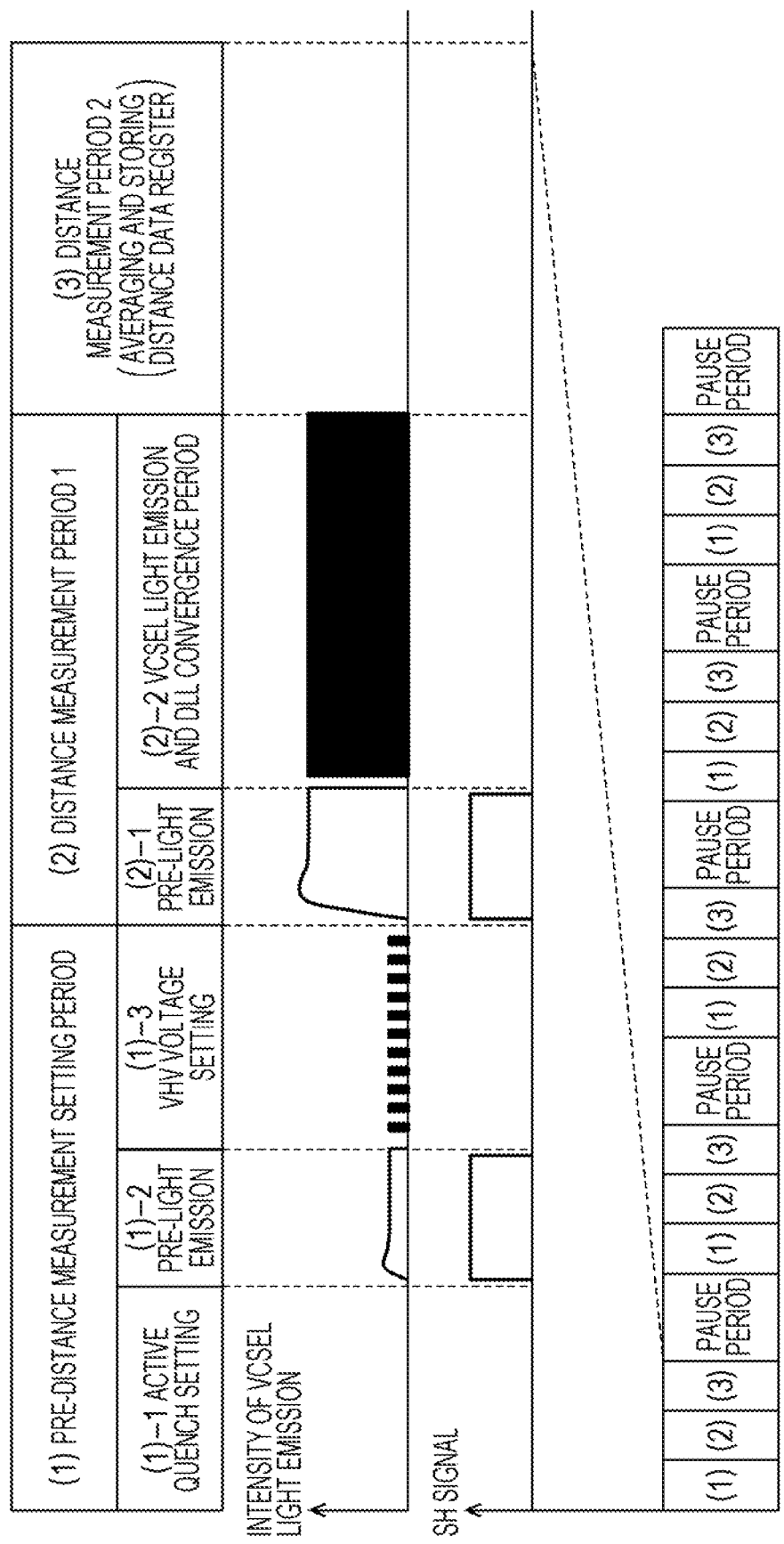
FIG. 4 is a VCSEL light emission sequence view of the TOF distance measurement sensor according to Embodiment 1 of the present disclosure.

FIG. 4 shows an operation sequence of the TOF distance measurement sensor 1. As shown in FIG. 4, the operation period of one time of distance measurement may be divided into three periods of (1) pre-measurement initial setting period, (2) distance measurement period 1 (VCSEL light emission and DLL convergence period), and (3) distance measurement period 2 (averaging and storing distance data register).

The pre-measurement initial setting period of (1) includes the active quench setting period of (1)-2, the pre-light emission period of (1)-2, and the VHV voltage setting period of (1)-3.

In (1)-1, the SPAD bias control block 36 sets the active quench resistance connected to the SPAD light-receiving elements arranged in the reference-side SPAD array 16 and the return-side SPAD array 18.

In (1)-2, the drive adjustment unit 14-2 sets the switch signal SH to the high level, turns on the switch SW1, and performs pre-light emission of the VCSEL12. In the period of (1)-2, the drive adjustment unit 14-2 adjusts so that the voltage of the drains of the PMOS transistor MP0 and the NMOS transistor MB0 is the same voltage with the voltage of the drain of the NMOS transistor MB1. After the adjustment, the drive adjustment unit 14-2 sets the switch signal SH to the low level, turns off the switch SW1, holds the potential of the capacitor C1 shown in FIG. 1, and controls so that the drive current of the VCSEL12 becomes a constant value.

In (1)-3, the drive control unit 14 causes the VCSEL12 to emit pulsed light. In addition, in (1)-3, the SPAD bias control block 36 sets bias voltages (VHV) to be applied to the reference-side SPAD array 16 and the return-side SPAD array 18. As a result, the reference-side SPAD array 16 and the return-side SPAD array 18 are initialized to operate in the optimum Geiger mode before the distance measurement period.

The distance measurement period 1 of (2) includes the pre-light emission period of (2)-1, the VCSEL light emission of (2)-2, and the DLL convergence period.

In the pre-light emission period of (2)-1, the drive adjustment unit 14-2 performs pre-light emission of the VCSEL12 again so as to control the current of the VCSEL12 to a constant value.

In the VCSEL light emission and the DLL convergence period of (2)-2, the drive control unit 14 causes the VCSEL12 to emit pulsed light, measures the distance, and converges the DLL.

In the period of (3), the delay amount of the converged DLL is counted, the distance from the distance measurement sensor 1 to the detection target 50 is converted into data and stored in the data register 34. Here, in the case of adjusting the VHV voltage by causing the VCSEL12 to emit light in the pre-measurement initial setting period of (1), the amount of light emitted from the VCSEL12 in the pre-measurement initial setting period of (1) is set smaller than the amount of light emitted from the VCSEL12 in the measurement of the distance in the distance measurement period 1 of (2). As a result, it is possible to suppress current consumption. In the VHV voltage setting period of (1)-3, the SPAD bias control block 36 adjusts the VHV voltage by counting the number of pulses of the reference-side SPAD array 16 to which direct light from the VCSEL12 is incident. That is, since the light amount is adjusted to the desired minimum amount, it is possible to achieve low current consumption.

That is, the light emission period includes two periods: a distance measurement period for measuring the distance of (2)-2 and a VHV voltage setting period of (1)-3 for setting the bias voltage of the VCSEL12. Then, the pre-light emission periods ((1)-2 and (2)-1) are provided before each of the two periods.

Embodiment 2

Another embodiment of the present disclosure will be described below with reference to FIG. 5. For the convenience of description, members having the same functions as the members described in the above embodiment are denoted by the same reference numerals, and description thereof will not be repeated.

Figure 5:
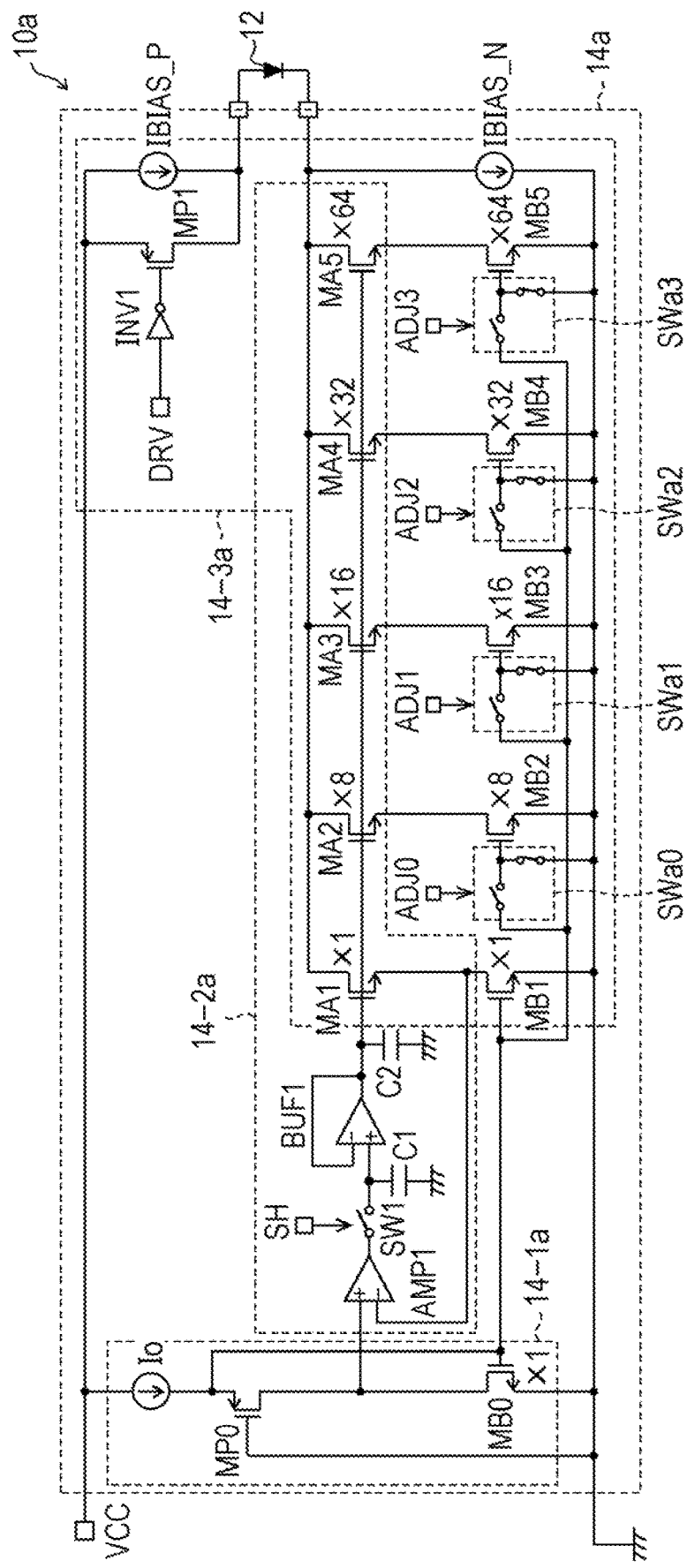
FIG. 5 is a block view of a VCSEL drive circuit according to Embodiment 2 of the present disclosure.

FIG. 5 shows a block view of a VCSEL drive circuit 1a that may be used for the TOF distance measurement sensor according to the present embodiment.

The VCSEL drive circuit 1a according to the present embodiment is different from the above embodiment in that a plurality of NMOS transistor pairs (MA1 and MB1), (MA2 and MB2), (MA3 and MB3), (MA4 and MB4), and (MA5 and MB5) are connected to the cathode side of the VCSEL12.

A light-emitting drive portion 14-3a includes NMOS transistors MA1 to MA5 and NMOS transistors MB1 to MB5. The drains of the NMOS transistors MA1 to MA5 are connected to the cathode side of the VCSEL12.

The gate of the NMOS transistor MB0 is connected to the gate of the NMOS transistor MB1. The gate of the NMOS transistor MB0 is connected to the gate of the NMOS transistor MB2 through which a current 8 times larger than that of the NMOS transistor MB0 flows via a switch portion SWa0 which is a changing portion. The gate of the NMOS transistor MB0 is connected to the gate of the NMOS transistor MB3 through which the current 16 times the current of the NMOS transistor MB0 flows via a switch portion SWa1. The gate of the NMOS transistor MB0 is connected to the gate of the NMOS transistor MB4 through which the current 32 times the current of the NMOS transistor MB0 flows via a switch portion SWa2. The gate of the NMOS transistor MB0 is connected to the gate of the NMOS transistor MB5 through which the current 64 times the current of the NMOS transistor MB0 flows via a switch portion SWa3.

The switch portions SWa0 to SWa3 are switched on and off by selection signals SEL0 to SEL3. It is possible to change the drive current of the VCSEL12 in each of the two periods ((1)-3 and (2)-2 in FIG. 4) by switching each of the switch portions SWa0 to SWa3.

The drive current of the VCSEL12 may be adjusted in 16 stages of Io, 9×Io, 17×Io, 25×Io, 33×Io, 41×Io, 49×Io, 57×Io, 65×Io, 73×Io, 81×Io, 89×Io, 97×Io, 105×Io, 113×Io, and 121×Io by switching each of the switch portions SWa0 to SWa3 by the selection signals SEL0 to SEL3.

Since the same voltage is applied to the gates of the NMOS transistors MA1 to MA5, even if the forward voltage of the VCSEL12 fluctuates, the drive current may be made constant.

Embodiment 3

Another embodiment of the present embodiment will be described below with reference to FIGS. 6 and 7. For the convenience of description, members having the same functions as the members described in the above embodiment are denoted by the same reference numerals, and description thereof will not be repeated.

Figure 6:
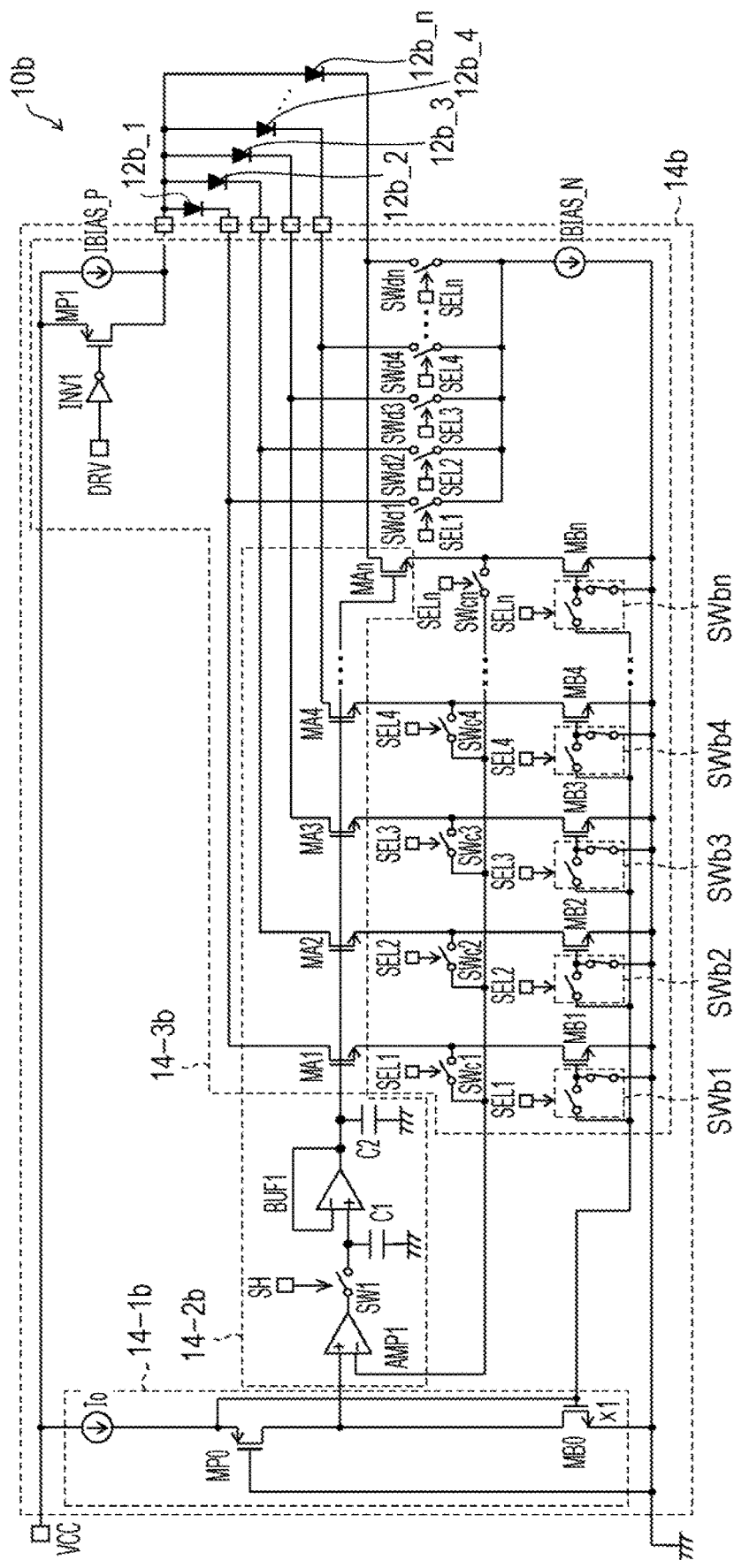
FIG. 6 is a block view of a VCSEL drive circuit according to Embodiment 3 of the present disclosure.
Figure 7:
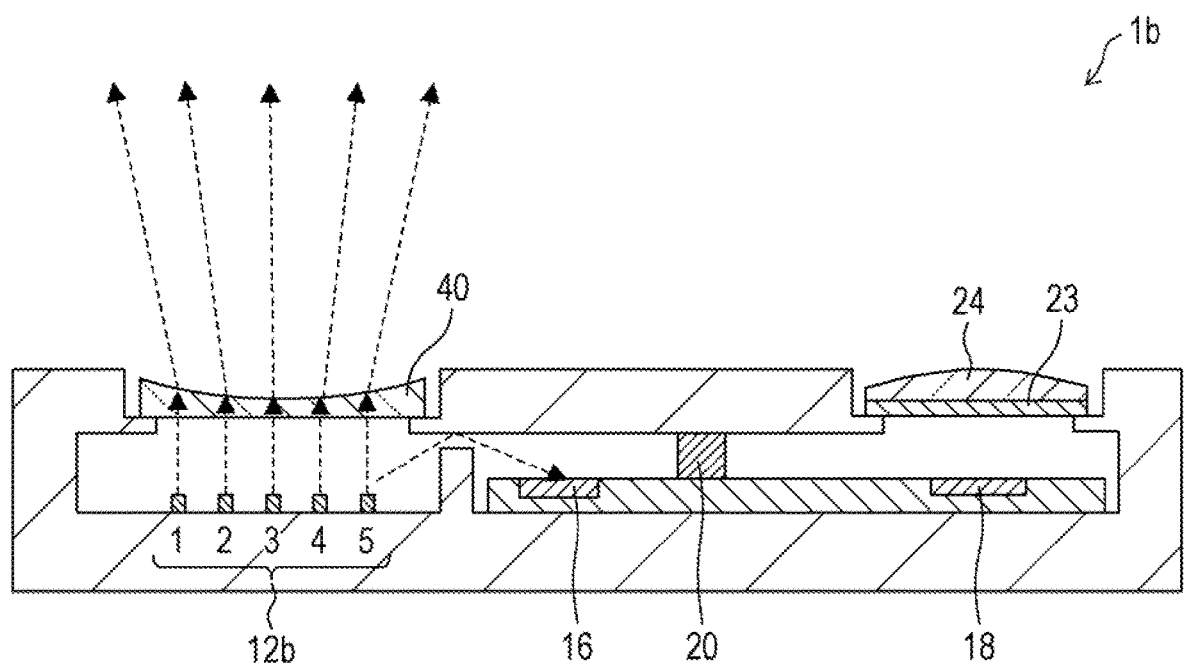
FIG. 7 is a cross-sectional view of a TOF distance measurement sensor according to Embodiment 3 of the present disclosure.
Figure 8:
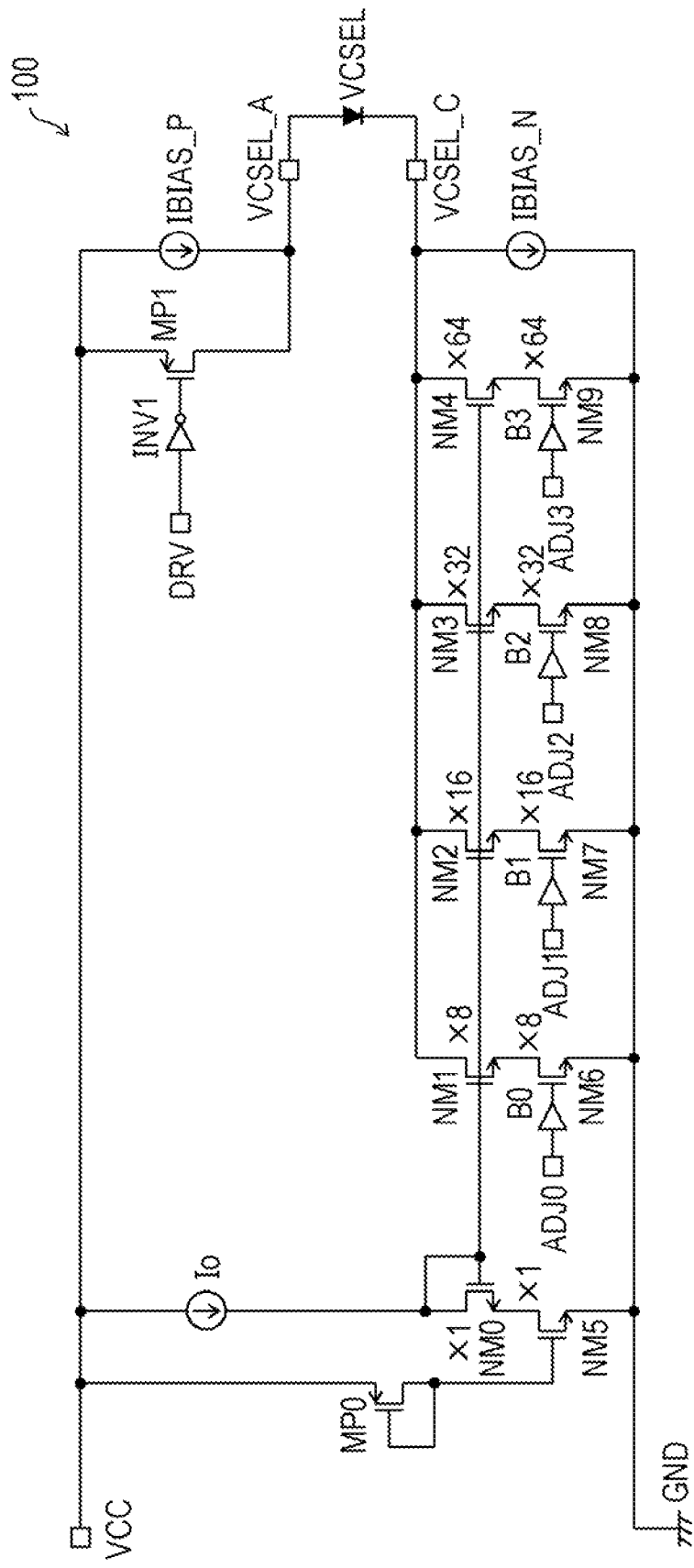
FIG. 8 is a block view of a VCSEL drive circuit of the related art.

FIG. 6 shows a block view of a VCSEL drive circuit 10b that may be used for the TOF distance measurement sensor according to the present embodiment. FIG. 7 is a cross-sectional view of a distance measurement sensor 1b using a VCSEL array 12b in which a plurality of VCSELs 1 to 5 are integrated. The distance measurement sensor 1b adopts a 2D-TOF method and may generate a distance image.

The VCSEL drive circuit 10b according to the present embodiment is different from the above embodiment in that a plurality of VCSELs are time-divisionally driven.

The VCSEL drive circuit 10b includes a plurality of VCSEL1 (12b_1) to VCSELn (12b_n).

In correspondence with the VCSEL1 (12b_1), there are provided three switches SWb1, SWc1, and SWd1 which are switched by the NMOS transistor MA1, the NMOS transistor MB1, and the selection signal SEL1.

The drain of the NMOS transistor MB1 is connected to the − input of the operational amplifier AMP1 via the switch portion SWc1. On/off of the switch portion SWc1 is switched by the selection signal SEL1. When the switch portion SWc1 is brought into a connected state by the selection signal SEL1, the drain of the NMOS transistor MB1 is connected to the − input of the operational amplifier AMP1.

In addition, the VCSEL1 (12b_1) is connected to the bias current source IBIAS_N via the switch portion SWd1. On/off of the switch portion SWd1 is switched by the selection signal SEL1. When the switch portion SWd1 is brought into a connected state by the selection signal SEL1, the VCSEL1 (12b_1) is connected to the bias current source IBIAS_N.

In addition, the gate of the NMOS transistor MB1 is connected to the gate of the NMOS transistor MB0 via the switch portion SWb1. On/off of the switch portion SWb1 is switched by the selection signal SEL1.

The selection signal SEL1 for switching the three switch sections SWb1, SWc1, and SWd1 is the same.

The VCSEL2 (12b_2) to the VCSELn (12b_n) are also configured similarly to the VCSEL1 (12b_1).

In a case where the VCSEL array 12b is driven, a drive control unit 14b may select arbitrary VCSEL1 (12b_1) to VCSELn (12b_n) according to the selection signals SEL1 to SELn to cause light emission in a time division manner. For example, in the case of causing the VCSEL1 (12b_1) to emit light, the selection signal SEL1 is set to the high level to activate the current mirror composed of the NMOS transistor MA1 and the NMOS transistor MB1.

Since the same voltage is applied to the gates of the NMOS transistors MA1 to MAn, even in a case where the forward voltage of each VCSEL of the VCSEL array 12b fluctuates, the drive current may be made constant.

Also in the present embodiment, since the VCSEL is driven in the same operation sequence as the operation sequence shown in FIG. 4, the drive current of the VCSEL may be controlled with high accuracy.

Summary

A light-emitting element drive circuit (VCSEL drive circuit 10) according to Aspect 1 of the present disclosure is a light-emitting element drive circuit (VCSEL drive circuit 10) that causes a light-emitting element (VCSEL12) to emit pulsed light in a light emission period, including a drive adjustment unit 14-2 that adjusts a first voltage which is the voltage of the drain of a first transistor (PMOS transistor MP0 and NMOS transistor MB0) included in the constant current circuit 14-1 and a second voltage which is the voltage of the drain of a second transistor (NMOS transistor MB1) that drives the light-emitting element (VCSEL12) to be the same voltage in a pre-light emission period before the light emission period.

According to the above configuration, it is possible to suppress the fluctuation of the drive current in the light-emitting element drive circuit that causes the light-emitting element to emit pulsed light.

A light-emitting element drive circuit (VCSEL drive circuit 10) according to Aspect 2 of the present disclosure is the light-emitting element drive circuit according to Aspect 1, in which the drive adjustment unit 14-2 may include a differential amplifier (operational amplifier AMP1) to which the first voltage and the second voltage are input and a capacitor C1 that holds an output voltage of the differential amplifier (operational amplifier AMP1) at the end of the pre-light emission period, and feedback may be applied to the differential amplifier (operational amplifier AMP1) so that the first voltage and the second voltage input to the differential amplifier (operational amplifier AMP1) become the same voltage in the pre-light emission period.

According to the above configuration, the first voltage and the second voltage may be adjusted to be the same voltage.

A light-emitting element drive circuit (VCSEL drive circuit 10a) according to Aspect 3 of the present disclosure is the light-emitting element drive circuit (VCSEL drive circuit 10a) according to Aspect 1 or 2 that is used for measuring a TOF distance from the light-emitting element drive circuit (VCSEL drive circuit 10a) to a target (detection target 50), in which the light emission period includes two periods, a distance measurement period for measuring the distance and a setting period for setting a bias voltage of the light-emitting element (VCSEL12), and the pre-light emission period is provided before each of the two periods, and a change portion (switch portions SWa0 to SWa3) that changes a drive current of the light-emitting element in each of the two periods.

According to the above configuration, the drive current of the VCSEL may be changed in multiple stages.

A light-emitting element drive circuit (VCSEL drive circuit 10) according to Aspect 4 of the present disclosure is the light-emitting element drive circuit according to Aspect 3, in which the constant current circuit 14-1 may include two of the first transistors (PMOS transistor MP0 and NMOS transistor MB0) and a constant current source Io, one (PMOS transistor MP0) of the first transistors has a gate connected to the constant current source, a source grounded, and a drain connected to the other drain of the first transistor (NMOS transistor MB0), and the other of the first transistors (NMOS transistor MB0) has a gate grounded, a source connected to the constant current source, and a drain connected to the drain of one (PMOS transistor MP0) of the first transistors.

According to the above configuration, a voltage serving as a reference of the current mirror may be output.

A light-emitting element drive circuit (VCSEL drive circuit 10b) according to Aspect 5 of the present disclosure is the light-emitting element drive circuit (VCSEL drive circuit 10a) according to Aspects 1 to 4, in which the plurality of light-emitting elements (VCSEL1 (12b_1) to VCSELn (12b_n)) may be driven in a time division manner.

According to the above configuration, a distance image may be generated by adopting a 2D-TOF method.

The present disclosure is not limited to the above-described embodiments, and various modifications are possible within the scope indicated in the claims, and embodiments obtained by appropriately combining technical means respectively disclosed in different embodiments are also included in the technical scope of the present disclosure. Furthermore, by combining technical means disclosed in each embodiment, new technical features may be formed.

The present disclosure contains subject matter related to that disclosed in Japanese Priority Patent Application JP 2017-221863 filed in the Japan Patent Office on Nov. 17, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A light-emitting element drive circuit that causes a light-emitting element to emit pulsed light in a light emission period, the circuit comprising:
   a drive adjustment unit that adjusts a first voltage which is a voltage of a drain of a first transistor included in a constant current circuit and a second voltage which is a voltage of a drain of a second transistor that drives the light-emitting element to be the same voltage in a pre-light emission period before the light emission period
   wherein the drive adjustment unit includes a differential amplifier to which the first voltage and the second voltage are input and a capacitor that holds an output voltage of the differential amplifier at the end of the pre-light emission period, and
   feedback is applied to the differential amplifier so that the first voltage and the second voltage input to the differential amplifier become the same voltage in the pre-light emission period.

2. A light-emitting element drive circuit that causes a light-emitting element to emit pulsed light in a light emission period, the circuit comprising:
   a drive adjustment unit that adjusts a first voltage which is a voltage of a drain of a first transistor included in a constant current circuit and a second voltage which is a voltage of a drain of a second transistor that drives the light-emitting element to be the same voltage in a pre-light emission period before the light emission period
   wherein the light-emitting element drive circuit is used for measuring a TOF distance from the light-emitting element drive circuit to a target,
   the light emission period includes two periods, a distance measurement period for measuring the distance and a setting period for setting a bias voltage of the light-emitting element,
   the pre-light emission period is provided before each of the two periods, and
   the circuit further comprises
   a change portion that changes a drive current of the light-emitting element in each of the two periods.

3. A light-emitting element drive circuit that causes a light-emitting element to emit pulsed light in a light emission period, the circuit comprising:
   a drive adjustment unit that adjusts a first voltage which is a voltage of a drain of a first transistor included in a constant current circuit and a second voltage which is a voltage of a drain of a second transistor that drives the light-emitting element to be the same voltage in a pre-light emission period before the light emission period
   wherein the constant current circuit includes two of the first transistors and a constant current source,
   one of the first transistors has a gate connected to the constant current source, a source grounded, and a drain connected to the other drain of the first transistor, and
   the other of the first transistor has a gate grounded, a source connected to the constant current source, and a drain connected to the drain of one of the first transistors.

4. The light-emitting element drive circuit according to claim 1,
   the light emitting element drive circuit drives a plurality of the light-emitting elements in a time division manner.

5. A portable electronic instrument comprising:
   the light-emitting element drive circuit according to claim 1.

6. The light-emitting element drive circuit according to claim 2,
   the light emitting element drive circuit drives a plurality of the light-emitting elements in a time division manner.

7. A portable electronic instrument comprising:
   the light-emitting element drive circuit according to claim 2.

8. The light-emitting element drive circuit according to claim 3,
   the light emitting element drive circuit drives a plurality of the light-emitting elements in a time division manner.

9. A portable electronic instrument comprising:
   the light-emitting element drive circuit according to claim 3.

* * * * *